3,065,537
METHOD OF BRAZING
Peter Patriarca, Knoxville, and Gerald M. Slaughter, Oak Ridge, Tenn., assignors to the United States of America, as represented by the United States Atomic Energy Commission
No Drawing. Filed Mar. 27, 1958, Ser. No. 724,486
3 Claims. (Cl. 29—494)

Our invention relates to an improved brazing composition which is suitable for use in a high temperature and corrosive environment, and to a method for preplacing said brazing composition.

Molten metals and molten salts find considerable use in industry as coolants due to their high heat capacity, high heat transfer coefficients, and low vapor pressures at elevated temperatures. Increasing interest in the use of those materials is being shown in nuclear reactor development. For example, sodium and sodium-potassium alloys are being used in reactor heat-exchange circuits. However, these media are corrosive and present difficult problems in the fabrication of reactor components.

In the fabrication of components for heat-exchange systems, items such as flanges, piping, and tanks may be easily fabricated using welding techniques. However, complex and delicate components such as fin-to-tube heat-exchangers are not amenable to fabrication by welding. Efforts have been directed, therefore, towards fabrication of the more complex reactor components using brazing methods, and stringent requirements must be met. For example, many commercial brazing compositions and fluxes are eliminated from consideration because of high thermal neutron cross-sections. Others are severely attacked by corrosive media and nuclear radiations. Another serious difficulty is in the preplacement of the brazing alloy on the surfaces to be joined. Electrolytic preplacing of brazing materials is not generally satisfactory because of inability to deposit a uniform plate on a complex surface.

One object of our invention, therefore, is to provide an improved method of joining metal surfaces for use in high-temperature, corrosive media.

Another object is to provide an improved brazing composition and method of preplacing said brazing composition in the joining of metal surfaces, wherein the resulting joint is resistant to oxidative and corrosive attack.

Another object is to provide a method in which said composition may be preplaced by a non-electrolytic method.

Another object is to provide a brazing composition that displays adequate mechanical strength and heat transfer characteristics and does not have a high total neutron absorption cross-section.

Still another object is to provide a method of performing said brazing in a relatively simple and rapid manner.

Other objects and advantages of our invention will become apparent from the following detailed description and the claims appended hereto.

In accordance with our present invention, metal surfaces may be joined by preplacing a brazing composition comprised of a major portion of nickel, a minor portion of phosphorous and a minor portion of chromium on said surfaces, and brazing together the resulting surfaces. The resulting alloy displays superior oxidation and corrosion resistance at elevated temperatures under prolonged exposure to molten metals; the metallurgical bond possesses adequate mechanical strength and heat transfer characteristics; and the alloy is satisfactory from the thermal neutron cross-section view-point. The brazing composition may be evenly preplaced on the surfaces to be joined, and during brazing displays excellent flow, wetability, and filleting properties.

The composition of the brazing alloy may vary over a considerable range, although the major constituent must be nickel. We generally find that the nickel content of the alloy should be at least approximately 70% by weight, a particularly suitable alloy comprising, for example, approximately 5%–15% phosphorous, by weight, and approximately 5%–15%, by weight, of chromium, the remainder being nickel. Our preferred brazing composition comprises approximately: 80% nickel, 10% phosphorous and 10% chromium. This composition has a flow point in the region of 1750–1800° F.

The brazing composition may be preplaced upon the metal surfaces to be joined in a variety of ways, and the exact method employed is not critical. One suitable method involves the chemical deposition of nickel and phosphorous and the subsequent electroplating of chromium on the deposited nickel and phosporous. The preferred method involves the application of a slurry (actually a paste) of the brazing composition upon the surfaces.

In the first method, nickel and phosphorous are first deposited from an aqueous bath by reaction between nickel ions and an anionic complex of phosphorous and oxygen, such as phosphite and hypophosphite. In one such reaction, employing nickel chloride and sodium hypophosphite, the hypophosphite is converted to the phosphite with subsequent deposition of nickel, perhaps in accordance with the reaction:

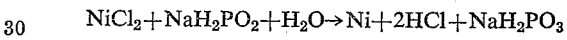
$$NiCl_2 + NaH_2PO_2 + H_2O \rightarrow Ni + 2HCl + NaH_2PO_3$$

Since the deposited nickel is found to contain phosphorous, secondary reactions of unknown mechanisms probably play a significant role in the deposition. The bath should be operated at close to a neutral pH and at an elevated temperature, say about 90–95° C. The rate of deposition is slow, being only about 0.00035 inch per hour, and to get a plate of the desired thickness, approximately 0.001 inch, may take several hours. Upon completion of the nickel-phosphorous deposition, the resulting plated surfaces may be made the cathode of a conventional electrolytic cell, and a very thin layer of chromium electroplated thereon. For the preferred composition the chromium layer should be approximately one-tenth the thickness of the nickel-phosphorous layer.

In the second, non-electrolytic preplacement method, the brazing compositon may be formed by mixing a comminuted nickelous material selected from the group consisting of metallic nickel and nickel oxide with chromium powder and with a readily reduced phosphorous compound, forming either an aqueous or organic slurry of the resulting mixture, applying the slurry upon the surfaces to be joined and permitting the coating to dry before brazing. Especially suitable phosphorous compounds are alkali metal compounds of the phosphorous complexes previously referred to, the preferred compound being dibasic ammonium phosphate. The nickel and chromium powder size may vary considerably, but approximately 200–500 mesh size is preferred. In addition to water, a number of organic carriers, readily volatilized in the brazing operation, are available for the slurry formation. An acetone-cellulose mixture may be used, for example. Another very suitable binder is a methyl methacrylate composition sold under the trade name of "Nicrobraz Cement" by the Wall Colmonoy Corporation of Detroit, Michigan. While the ratio of the organic or water carrier to the nickel-phosphorous-chromium composition may satisfactorily vary, approximately 1 part carrier to 2 parts brazing composition, by volume, is quite suitable. The slurry may be easily applied on the surfaces to be joined by a number of different ways, one method being simply by brushing. In the brazing of finto-tube heat exchangers and other like devices, the heat exchanger may be assembled piece-by-piece, and the slurry applied to each surface during the assembling operation. Since such an assembly usually has enough mechanical strength to retain its proper configuration temporarily, the entire brazing operation may be performed upon completion of the assembly.

Once the Ni-P-Cr mixture has been applied to the surfaces to be joined, the brazing operation may be performed in a variety of conventional ways, and the exact method employed is not critical to the success of our invention. One satisfactory method comprises placing the nickel-phosphorous-chromium covered surfaces in a dry, non-oxidizing atmosphere, preferably a hydrogen atmosphere, for about 10 minutes at a temperature above the melting point of the brazing composition, and this produces an alloy of the brazing constituents. For the preferred composition of 80 percent nickel, 10 percent phosphorous, 10 percent chromium the preferred brazing temperature is approximately 1800° F. As the nickel-phosphorous-chromium mixture melts, it seeks the nearest capillary, and adequately fills unplated metal along a joint to form a uniform fillet along the full length of the joint.

Our brazing method may be satisfactorily used in joining a wide variety of metals with a melting point higher than the melting point of the brazing composition. All nickel and iron-base alloys may be joined using our method. Typical of the commercially available alloys which may be joined by our method are all the stainless steels and the alloys sold as the "Nichromes," "Inconels" and "Chromels."

The following examples will illustrate our invention in greater detail.

*Example I*

A series of stainless steel radial fins was prepared by punching 0.190 inch holes in 0.010 inch type 304 stainless steel sheet, leaving a lip to provide a 15 fin per inch spacing. These fins were brushes with a mixture of "Nicrobraz Cement," nickel and chromium powder, and dibasic ammonium phosphate. The mixture was comprised of approximately 10% phosphorous, 10% chromium and 80% nickel, by weight, and the volumetric ratio of binder to brazing composition was approximately one to two. After drying, a brazing composition layer approximately 0.0015 inch thick was measured. The fins were then assembled with type 316 stainless steel tubing having a 3/16 inch outside diameter and 0.02 inch wall thickness, thereby making a small heat exchanger specimen, and were brazed for ten minutes at 1800° F. in a globar furnace having a dry hydrogen atmosphere. After removal from the furnace it was noted that adequate flow, wetting, and filleting had occurred. A portion of a sectioned fin-to-tube joint was then subjected to an oxidation test in static air at 1500° F. for 100 hours. A photomicrograph of the joint after exposure revealed that the extent of corrosive attack was negligible.

*Example II*

Fins for a fin-to-tube heat exchanger were prepared by punching 0.190 inch holes in 0.010 inch type 304 stainless steel sheet. A lip was left to provide a 15 fin per inch spacing. These fins were plated with a nickel-phosphorous composition, using the following procedure. The fins were degreased, anodically etched in 37% HCl for one minute at room temperature using 6 volts, in order to clean the surface. The resulting fins were given a nickel "strike" for five minutes at 2 volts, at a temperature of 70–80° F. and at pH 0.5 in a bath containing one gallon of water, 40 ounces $NiCl_2 \cdot 6H_2O$ and 4 ounces of boric acid. The fins were rinsed, washed in 37% HCl and immediately placed in nickel-hypophosphite bath made as follows: 27 grams sodium carbonate were dissolved in distilled water and the solution was boiled with the slow addition of glycolic acid to give pH 7. The solution was cooled, and then filtered. Distilled water was added to the filtrate to make about 2/3 liter and 30 grams of nickel chloride were dissolved therein. 10 cc. hypophosphite solution, prepared by dissolving 100 grams sodium hypophosphite in 100 cc. distilled water, were added, the resulting solution was filtered and enough distilled water was added to the filtrate to make 1 liter. The bath was then maintained at 90–95° C. and pH 6, using NaOH or HCl to maintain the pH. About two cc. hypophosphite solution was added every thirty minutes. The rate of deposition was approximately 0.00035 inch per hour, and the deposition was continued until a thickness of about 0.020 of an inch was obtained. Onto this plate approximately 0.002 inch of chromium was plated by conventional electrodeposition means. The resulting fins were then fitted onto 3/16 inch O.D. tubes having a wall thickness of 0.020 inch. This assembly was brazed at 1800° F. for 10 minutes in a dry hydrogen atmosphere, and excellent flow, wetability and filleting were observed. A portion of the specimen was then evaluated for corrosion resistance in molten sodium at 1500° F. The extent of the attack after 100 hours exposure time was negligible; and the fillet remained relatively sound with only minor attack at the fillet-sodium interface. Another portion of the assembly was exposed to static air at 1500° F. for 500 hours and virtually no oxidation was revealed.

The above examples are merely illustrative and should not be construed as limiting the scope of our invention. It should be apparent that those skilled in metallurgy may make variations in our method without departing from the spirit of our invention. Therefore, our invention should be limited only as indicated by the appended claims.

Having thus described our invention, we claim:

1. An improved method of brazing structural metal parts, the base metal of which is selected from the group consisting of iron and nickel, comprising the steps of disposing the surfaces of said parts to be brazed in closely-spaced relationship, placing at the resulting gap area between the surfaces a mixture consisting of dibasic ammonium phosphate, chromium and a nickeliferous material selected from the group consisting of nickel and nickel oxide in a proportion yielding an alloy comprising approximately 80% nickel, 10% phosphorus and 10% chromium, then heating said metal parts to a temperature of at least 1800° F. and maintaining said metal parts in a reducing atmosphere of dry hydrogen during the brazing operation.

2. The method of claim 1 wherein the mixture of dibasic ammonium phosphate, chromium, and the nickeliferous material is in the form of a slurry.

3. The method of claim 2 wherein the slurry is formed by mixing an organic binder in approximate volumetric proportions of one part binder to two parts nickel-phosphate-chromium mixture.

References Cited in the file of this patent

UNITED STATES PATENTS

| | | |
|---|---|---|
| 2,026,243 | Moore | Dec. 31, 1935 |
| 2,245,566 | Bolton | June 17, 1941 |
| 2,462,002 | Read | Feb. 15, 1949 |
| 2,627,110 | Hickey | Feb. 3, 1953 |
| 2,714,760 | Boam et al. | Aug. 9, 1955 |
| 2,795,040 | Antel et al. | June 11, 1957 |
| 2,822,609 | Horvitz | Feb. 11, 1958 |
| 2,842,440 | Nachtman et al. | July 8, 1958 |
| 2,864,693 | Cape et al. | Dec. 16, 1958 |
| 2,902,617 | Cole | Sept. 1, 1959 |
| 2,987,817 | Kozlik | June 13, 1961 |

FOREIGN PATENTS

| | | |
|---|---|---|
| 487,263 | Great Britain | June 17, 1938 |